United States Patent
Deng et al.

(10) Patent No.: US 12,075,506 B2
(45) Date of Patent: Aug. 27, 2024

(54) METHOD FOR REJOINING NETWORK AFTER NETWORK DISCONNECTION OF MOBILE TERMINAL AND RELATED DEVICES

(71) Applicant: BOE Technology Group Co., Ltd., Beijing (CN)

(72) Inventors: Wei Deng, Beijing (CN); Yifei Zhang, Beijing (CN); Kai Zhao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 425 days.

(21) Appl. No.: 17/435,025

(22) PCT Filed: Feb. 24, 2021

(86) PCT No.: PCT/CN2021/077710
§ 371 (c)(1),
(2) Date: Aug. 30, 2021

(87) PCT Pub. No.: WO2021/218317
PCT Pub. Date: Nov. 4, 2021

(65) Prior Publication Data
US 2022/0322479 A1      Oct. 6, 2022

(30) Foreign Application Priority Data
Apr. 29, 2020   (CN) .......................... 202010358407.7

(51) Int. Cl.
*H04W 76/19*    (2018.01)
*H04W 48/10*    (2009.01)
(Continued)

(52) U.S. Cl.
CPC .......... *H04W 76/19* (2018.02); *H04W 48/10* (2013.01); *H04W 52/0229* (2013.01); *H04W 76/18* (2018.02); *H04W 60/00* (2013.01)

(58) Field of Classification Search
CPC . H04W 76/19; H04W 48/10; H04W 52/0229; H04W 76/18; H04W 60/00;
(Continued)

(56) References Cited

U.S. PATENT DOCUMENTS

| | | | |
|---|---|---|---|
| 2008/0159125 A1* | 7/2008 | Ando | H04W 8/12 370/221 |
| 2014/0198727 A1 | 7/2014 | Ogawara | |

(Continued)

FOREIGN PATENT DOCUMENTS

| | | |
|---|---|---|
| CN | 103260214 A | 8/2013 |
| CN | 103929831 A | 7/2014 |

(Continued)

OTHER PUBLICATIONS

Clynch et al., "Equations of an Ellipse", Aug. 2006, San Francisco State University. (Year: 2006).*

(Continued)

*Primary Examiner* — Michael K Phillips
(74) *Attorney, Agent, or Firm* — Ling Wu; Stephen Yang; Ling and Yang Intellectual Property

(57) ABSTRACT

A method for rejoining a network after network disconnection of a mobile terminal and related devices are provided. The method includes: a gateway determining whether to disconnect from a target mobile terminal; if yes, feeding back network disconnection information of the target mobile terminal to a server; receiving a supplementary broadcast frame instruction sent by the server; and the gateway sending a supplementary broadcast frame according to the supplementary broadcast frame instruction.

13 Claims, 5 Drawing Sheets

(51) Int. Cl.
*H04W 52/02* (2009.01)
*H04W 76/18* (2018.01)
*H04W 60/00* (2009.01)

(58) Field of Classification Search
CPC ..... H04W 76/25; H04W 60/04; H04W 76/40; H04W 52/02; Y02D 30/70
See application file for complete search history.

(56) References Cited

U.S. PATENT DOCUMENTS

| | | | |
|---|---|---|---|
| 2014/0376536 A1 | 12/2014 | Ding et al. | |
| 2015/0223265 A1* | 8/2015 | Fwu | H04B 7/0456 370/329 |
| 2016/0234739 A1* | 8/2016 | Puddle | H04W 36/04 |
| 2017/0273053 A1* | 9/2017 | Ryu | H04W 68/02 |
| 2017/0302557 A1 | 10/2017 | Brooks et al. | |
| 2019/0132737 A1 | 5/2019 | Yu | |
| 2019/0159111 A1 | 5/2019 | Yu | |
| 2022/0217219 A1* | 7/2022 | Hassan | H04L 67/288 |

FOREIGN PATENT DOCUMENTS

| | | | | |
|---|---|---|---|---|
| CN | 106507289 A | 3/2017 | | |
| CN | 106604363 A | 4/2017 | | |
| CN | 109257803 A | 1/2019 | | |
| CN | 109413612 A | 3/2019 | | |
| CN | 109479261 A | 3/2019 | | |
| CN | 109756405 A * | 5/2019 | | |
| CN | 110557448 A | 12/2019 | | |
| EP | 2416609 A1 * | 2/2012 | ........... | H04W 24/02 |
| WO | WO-2016074452 A1 * | 5/2016 | | |

OTHER PUBLICATIONS

Yu, A Wireless Fidelity Wi-Fi Scanning Method and Mobile Terminal, Apr. 26, 2017, CN, English language translation of CN-106604363. (Year: 2017).*

Gao et al., "Paging Method, System, Related Device and Computer Storage Medium", May 19, 2016, WO, English language translation of WO 2016074452. (Year: 2016).*

"Dynamic Clustering-Based Adaptive Mobile Gateway Management in Integrated VANET—3G Heterogeneous Wireless Networks", Mar. 2011, IEEE, IEEE Journal on Selected Areas in Communications, vol. 29, No. 3, pp. 559-570. (Year: 2011).*

International Search Report for PCT/CN2021/077710 Mailed Apr. 30, 2021.

Office Action dated Aug. 5, 2022 for Chinese Patent Application No. 202010358407.7 and English Translation.

* cited by examiner

METHOD FOR REJOINING NETWORK AFTER NETWORK DISCONNECTION OF MOBILE TERMINAL AND RELATED DEVICES

CROSS-REFERENCE TO RELATED APPLICATIONS

The present application is a U.S. National Phase Entry of International Application PCT/CN2021/077710 having an international filing date of Feb. 24, 2021, which claims priority of Chinese patent application No. 202010358407.7 filed to CNIPA on Apr. 29, 2020, entitled "Method for Rejoining Network after Network Disconnection of Mobile Terminal and Related Devices", the content of which should be construed as being hereby incorporated by reference in their entirety.

TECHNICAL FIELD

The embodiments of the present disclosure relate to, but are not limited to, the technical field of Internet of Things, in particular to a method for rejoining a network after network disconnection of a mobile terminal and related devices.

BACKGROUND

Mobile terminals, such as electronic badges, smart cards, and bedside cards are wearable electronic devices with certain data processing and display functions.

In an Internet of Things system of an intelligent mobile terminal, since a mobile terminal may be moving at any time, switching of a gateway to which the mobile terminal is connected occurs frequently. Generally, the mobile terminal determines a nearby gateway and a protocol time slot by listening to a broadcast frame of the gateway and performs contention registration in a certain idle time slot to implement a network connection, leading to that the mobile terminal may often be in a "network-disconnected" state in the process of switching the gateway. Once disconnected from a network, the mobile terminal is in a listening mode, in which case the power consumption of the mobile terminal is increased to a milliampere level, thus the power consumption of the mobile terminal is significantly increased.

SUMMARY

The following is a summary of the subject matter detailed herein. This summary is not intended to limit the scope of protection of the claims.

One or more embodiments of the present disclosure provide a method for rejoining a network after network disconnection of a mobile terminal, which is applied to a gateway device and includes:

determining to disconnect network connection with a target mobile terminal; and sending a supplementary broadcast frame if the gateway device is disconnected from the target mobile terminal.

In an exemplary embodiment, determining to disconnect network connection with the target mobile terminal includes:

determining whether a heartbeat frame of the target mobile terminal is received within a predetermined time interval.

In an exemplary embodiment, sending the supplementary broadcast frame includes:

sending the supplementary broadcast frame in an idle time slot.

In an exemplary embodiment, the method further includes:

feeding back network disconnection information of the target mobile terminal to a server if the connection between the gateway device and the target mobile terminal is disconnected;

receiving a supplementary broadcast frame instruction fed back by the server; and sending the supplementary broadcast frame according to the supplementary broadcast frame instruction.

In an exemplary embodiment, a time difference between feeding back the network disconnection information and sending the supplementary broadcast frame is less than a cycle that the target mobile terminal sends the heartbeat frame.

One or more embodiments of the present disclosure provide a method for rejoining a network after network disconnection of a mobile terminal, which is applied to a server and includes:

receiving network disconnection information of a target mobile terminal of a gateway device fed back by the gateway device; and sending a supplementary broadcast frame instruction to the gateway device and at least one other gateway device within a first preset distance range relative to the gateway device, wherein the first preset distance range is a range defined by taking the gateway device as a center and a first distance as a radius.

In an exemplary embodiment, the method further includes: receiving locating information fed back by the target mobile terminal;

sending the supplementary broadcast frame instruction to the gateway device and the at least one other gateway device within the first preset distance range relative to the gateway device includes:

determining a second preset distance range according to the locating information, wherein the second preset distance range is a range defined by taking a positioned location in the locating information as a center and a second distance as a radius; and sending the supplementary broadcast frame instruction to the gateway device and other gateway device within the first preset distance range and the second preset distance range.

In an exemplary embodiment, the method further includes:

determining locating information fed back by the target mobile terminal last time;

sending the supplementary broadcast frame instruction to the gateway device and at least one other gateway device within the first preset distance range relative to the gateway device includes:

determining the second preset distance range according to the locating information fed back by the target mobile terminal last time, wherein the second preset distance range is a range defined by taking a positioned location in the locating information fed back last time as a center and the second distance as a radius; and sending the supplementary broadcast frame instruction to the gateway device and other gateway device within the first preset distance range and the second preset distance range.

In an exemplary embodiment, the method further includes:

receiving locating information fed back by the target mobile terminal; and determining a movement track of the target mobile terminal according to the locating information fed back by the target mobile terminal and received within a predetermined time length range from a current time node;

sending the supplementary broadcast frame instruction to the gateway device and the at least one other gateway device within the first preset distance range relative to the gateway device includes:

determining a predicted movement direction of the target mobile terminal according to the movement track; and sending the supplementary broadcast frame instruction to the gateway device and other gateway device within the first preset distance range and in the predicted movement direction relative to the gateway device.

One or more embodiments of the present disclosure provide a method for rejoining a network after network disconnection of a mobile terminal, which is applied to a gateway device and includes:

receiving a supplementary broadcast frame instruction sent by a server; and sending a supplementary broadcast frame according to the supplementary broadcast frame instruction.

In an exemplary embodiment, sending the supplementary broadcast frame includes:

sending the supplementary broadcast frame in an idle time slot.

One or more embodiments of the present disclosure provide a method for rejoining a network after network disconnection of a mobile terminal, which is applied to a mobile terminal and includes:

determining whether to disconnect network connection with a gateway device;

if it is determined to disconnect the network connection with the gateway device, receiving a supplementary broadcast frame sent by the gateway device after the disconnection from the gateway device or a supplementary broadcast frame sent by other gateway device; and establishing a connection with the gateway device or other gateway device according to the supplementary broadcast frame.

In an exemplary embodiment, the method further includes: sending a heartbeat frame to the gateway device; and determining whether to disconnect network connection with the gateway device includes: determining whether a response message from the gateway device for the heartbeat frame is received.

In an exemplary embodiment, a time difference between disconnecting from the gateway device and receiving the supplementary broadcast frame is less than twice a cycle that the mobile terminal sends the heartbeat frame.

In an exemplary embodiment, the method further includes:

feeding back locating information of the mobile terminal to a server.

One or more embodiments of the present disclosure provide a gateway device, including:

a first processing unit configured to determine whether to disconnect network connection with a target mobile terminal, and generate a supplementary broadcast frame according to a supplementary broadcast frame instruction; and a first communication unit configured to:

feed back network disconnection information of the target mobile terminal to a server when network connection with the target mobile terminal is disconnected;

receive the supplementary broadcast frame instruction sent by the server; and send the supplementary broadcast frame according to the supplementary broadcast frame instruction.

One or more embodiments of the present disclosure provide a server, including:

a second communication unit configured to receive network disconnection information of a target mobile terminal fed back by a gateway device, and send a supplementary broadcast frame instruction to the gateway device and at least one other gateway device within a first preset distance range; and a second processing unit configured to generate the supplementary broadcast frame instruction according to the network disconnection information, wherein the first preset distance range is a range defined by taking the gateway device as a center and a first distance as a radius.

One or more embodiments of the present disclosure provide a gateway device, including:

a third communication unit configured to: receive a supplementary broadcast frame instruction sent by a server, and send a supplementary broadcast frame according to the supplementary broadcast frame instruction; and a third processing unit configured to generate the supplementary broadcast frame according to the supplementary broadcast frame instruction.

One or more embodiments of the present disclosure provide a mobile terminal, including:

a fourth communication unit configured to:

disconnect from a gateway device;

receive a supplementary broadcast frame sent by the gateway device or a supplementary broadcast frame sent by other gateway device; and establish a connection with the gateway device or other gateway device according to the supplementary broadcast frame.

One or more embodiments of the present disclosure provide a system for rejoining a network after network disconnection of a mobile terminal, including:

the gateway device described above;

the server described above;

at least one gateway device described above; and at least one mobile terminal described above.

One or more embodiments of the present disclosure provide an electronic device, including a memory, a processor, and a computer program stored on the memory and runnable on the processor, wherein the processor implements any of the methods described above when executing the computer program.

One or more embodiments of the present disclosure provide a non-transitory computer-readable storage medium, wherein the non-transitory computer-readable storage medium stores a computer instruction, and the computer instruction is used to enable the computer to execute any of the methods described above.

Other aspects can be understood upon reading and understanding of the drawings and the detailed description.

BRIEF DESCRIPTION OF DRAWINGS

The drawings to be used in the embodiments will be briefly introduced in the following. Apparently, the drawings in the following description are only one or more embodiments of the present disclosure. For those skilled in the art, other drawings may be obtained according to these drawings without using any inventive effort.

DETAILED DESCRIPTION

The present disclosure is described below in further details in combination with specific embodiments with reference to the drawings. It should be noted that the embodiments in the present disclosure and the features in the embodiments may be randomly combined with each other if there is no conflict.

Unless otherwise defined, technical terms or scientific terms used in one or more embodiments of the present disclosure shall have a general meaning understood by those skilled in the art to which the present disclosure pertains. Wordings such as "first" and "second" used in one or more embodiments of the present disclosure do not represent any order, quantity, or importance, but are only used to distinguish different components. Wordings such as "include" or "comprise" indicate that the elements or objects in front of the phrases cover the elements or objects listed behind the phrases and their equivalents but do not exclude other elements or objects. Wordings such as "connect" or "connected" are not limited to physical or mechanical connection, but may include electrical connection, whether direct or indirect.

Figure 1:
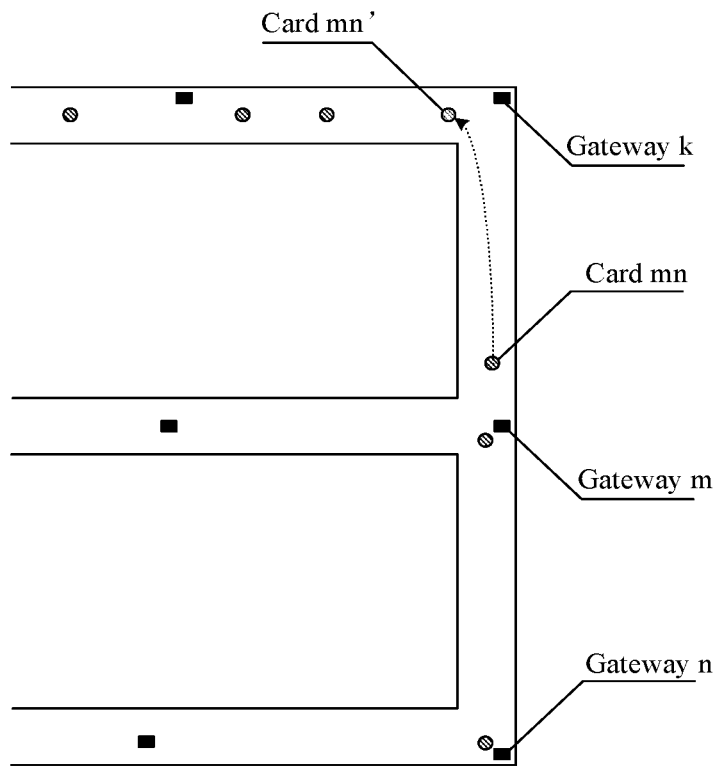
FIG. 1 is a schematic diagram of a movement state of a mobile terminal in one or more embodiments of the present disclosure.

In an Internet of Things system of a mobile terminal, referring to FIG. 1, since a mobile terminal may be moving at any time, switching of a gateway to which the mobile terminal belongs occurs frequently. In a protocol design, the mobile terminal determines a nearby gateway and a protocol time slot by listening to a broadcast frame of the gateway and performs contention registration in a certain idle time slot, leading to that the mobile terminal may often be in a "network-disconnected" state. Once disconnected from a network, the mobile terminal is in a listening mode, in which case a communication chip (such as Sx1278) is in a receiving state and the power consumption of the mobile terminal is increased to a milliampere level (the power consumption is generally at a microampere level in a normal network-connected state), that is, the power consumption of the mobile terminal is significantly increased.

During actual use, the location of the gateway is generally fixed, but the mobile terminal is movable. Therefore, the mobile terminal may be disconnected from the gateway to which the mobile terminal belongs and re-registers to join a network at another gateway. Referring to FIG. 1, for example, a certain mobile terminal Card mn under a gateway m may be disconnected from the gateway m after movement and join a network through another gateway k, thereby becoming a mobile terminal Card mn' under the gateway k.

In this process, the mobile terminal Card mn needs to go through the following three stages:

1. It is determined that the mobile terminal is disconnected from the gateway m. After registering to the gateway m, the mobile terminal Card mn performs a heartbeat to the gateway m in a time slot thereof for each cycle T (for example, 60 s), for example, at moments t1, t2, and t4 illustrated in FIG. 2. If a response is received, it is considered that the mobile terminal is connected to a network; and if no response is received from the gateway m, it is considered that the mobile terminal is disconnected from the gateway m. Correspondingly, if no heartbeat frame sent by the mobile terminal is received by the gateway device within the heartbeat cycle of the mobile terminal, the gateway device determines that the mobile terminal is already disconnected from a network.

2. After it is determined that the mobile terminal is disconnected from the gateway m, the mobile terminal listens to a broadcast of the gateway k. After disconnected from the gateway, the mobile terminal starts to listen to broadcast information of nearby gateway(s). In this case, a communication chip (such as Sx1278) of the mobile terminal is in the receiving state and the consumption of current is relatively high. When the mobile terminal detects broadcast information of a gateway and the Received Signal Strength Indication (RSSI) of the gateway (denoted as gateway k) satisfies an expectation, the mobile terminal prepares to register to this gateway.

3. An idle time slot is found and the mobile terminal registers to join a network. After detecting the idle time slot of the gateway, the mobile terminal registers to the gateway k to join a network.

It can be seen that, from disconnecting from a network to rejoining a network, the mobile terminal needs to wait for a time difference of t4–t2. The time difference is equal to a length of the heartbeat frame cycle of the mobile terminal, which is generally 60 s. During this time, the power consumption of the communication chip is at a milliampere level, thereby significantly increasing the power consumption of the mobile terminal.

Therefore, for reducing the system power consumption and improving the timeliness of a response of the mobile terminal, it is of great significance to reduce a network disconnection time of the mobile terminal, i.e., to rejoin the network quickly by the mobile terminal.

Figure 3:
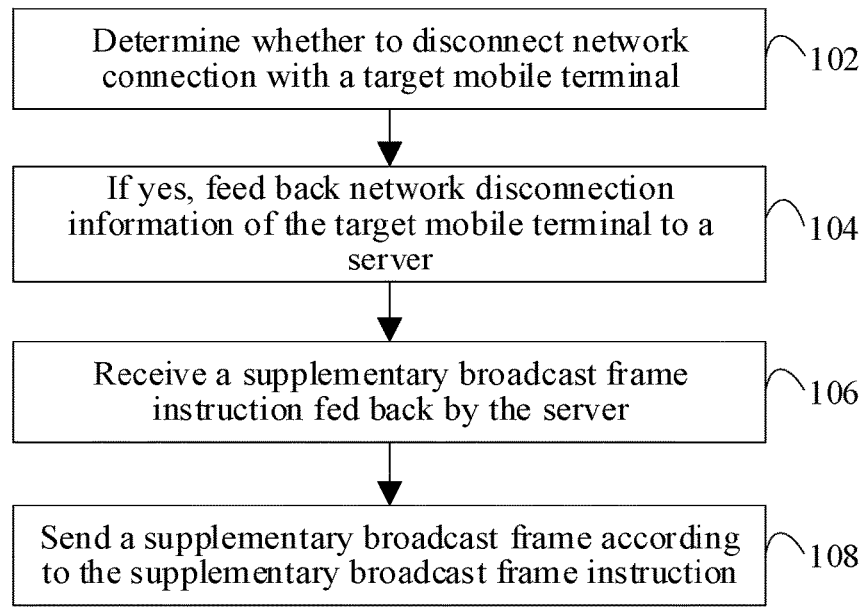
FIG. 3 is a schematic flowchart of a method for rejoining a network after network disconnection of a mobile terminal according to one or more embodiments of the present disclosure.

Accordingly, one or more embodiments of the present disclosure provide a method for rejoining a network after network disconnection of a mobile terminal. FIG. 3 illustrates a schematic flowchart of the method for rejoining a network after network disconnection of a mobile terminal according to one or more embodiments of the present disclosure.

Referring to FIG. 3, the method for rejoining a network after network disconnection of a mobile terminal is applied to a gateway device and includes:

Step 102, determining whether to disconnect network connection with a target mobile terminal.

In this step, the target mobile terminal may be any mobile terminal establishing a network connection with the gateway device.

In an exemplary embodiment, for the mobile terminal establishing the network connection with the gateway device, the gateway device determines whether the mobile terminal maintains a normal network connection with the gateway device at a predetermined time interval.

In an exemplary embodiment, the mobile terminal sends a heartbeat frame to the gateway device in a predetermined cycle through a heartbeat mechanism. If the gateway device receives the heartbeat frame within the predetermined cycle, it is considered that the network connection between the mobile terminal and the gateway device is normal.

Therefore, as an exemplary embodiment, determining whether to disconnect network connection with the target mobile terminal includes:

determining whether the heartbeat frame of the target mobile terminal is not received within a predetermined time interval; and if the heartbeat frame is not received within the predetermined time interval, it indicates that the target mobile terminal is disconnected.

In this way, whether the target mobile terminal is disconnected from a network is determined by detecting the heartbeat frame, thus a network connection state of the target mobile terminal can be accurately determined.

Step 104, if the target mobile terminal is disconnected, network disconnection information of the target mobile terminal is fed back to a server.

Figure 5:
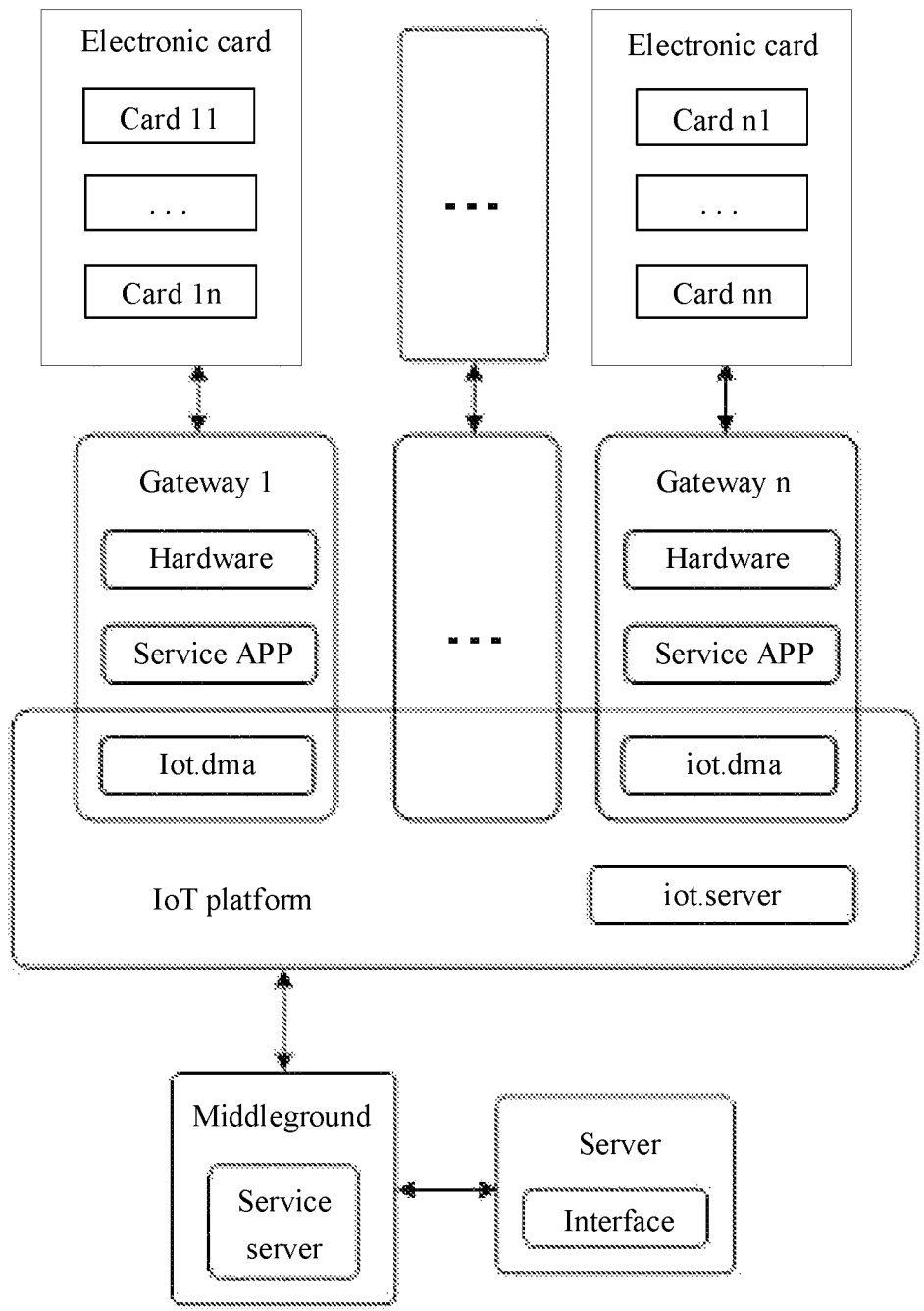
FIG. 5 is a schematic diagram of a structure of a system for rejoining a network after network disconnection of a mobile terminal according to one or more embodiments of the present disclosure.

In this step, referring to FIG. 5, feeding back the network disconnection information of the target mobile terminal to the server may be that the gateway device feeds back the network disconnection information of the target mobile terminal to the server via an Internet of Things platform (IoT platform) or a middleground. In an exemplary embodiment, the server may be a web server.

Step 106, receiving a supplementary broadcast frame instruction fed back by the server.

In this step, after receiving the network disconnection information of the target mobile terminal fed back by the gateway device, the server generates a temporary supplementary broadcast frame instruction according to the network disconnection information, and feeds back the supplementary broadcast frame instruction to the gateway device, so that the gateway device sends a temporary supplementary broadcast frame according to the supplementary broadcast frame instruction.

In an exemplary embodiment, the supplementary broadcast frame instruction may be fed back to the gateway device by the server via a middleground and or an IoT platform.

Step 108, sending a supplementary broadcast frame according to the supplementary broadcast frame instruction.

In this step, the gateway device sends a temporary supplementary broadcast frame according to the supplementary broadcast frame instruction, so that the target mobile terminal can establish a network connection with the gateway device according to the supplementary broadcast frame without waiting for one heartbeat frame cycle.

Figure 2:
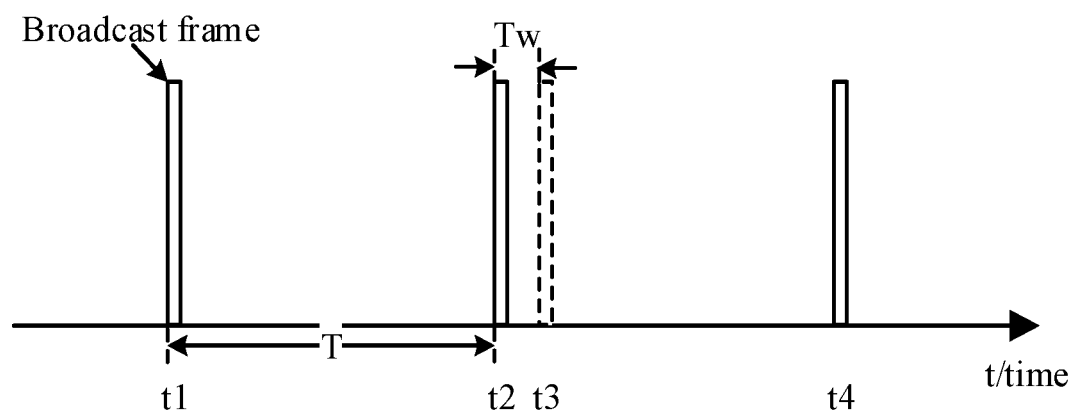
FIG. 2 is a schematic diagram of broadcast frames sent by a gateway before and after network disconnection when a mobile terminal rejoins a network in one or more embodiments of the present disclosure.

In an exemplary embodiment, a time difference between feeding back the network disconnection information and sending the supplementary broadcast frame is less than the cycle that the target mobile terminal sends the heartbeat frame. Referring to FIG. 2, the time difference between feeding back the network disconnection information and sending the supplementary broadcast frame is t3–t2, which is less than an original waiting time t4–t2 (i.e., the heartbeat frame cycle).

As an exemplary embodiment, the step of sending the supplementary broadcast frame is to send the supplementary broadcast frame in an idle time slot. In this way, a normal working process is not affected by sending the supplementary broadcast frame in the idle time slot.

In one or more embodiments of the present disclosure, the gateway device may actively send the supplementary broadcast frame after determining that the target mobile terminal is disconnected from a network, without need of uploading the network disconnection information to the server or waiting for the supplementary broadcast frame instruction of the server, so that the gateway device can send the supplementary broadcast frame more quickly.

It can be seen from the above embodiments that the method for rejoining a network after network disconnection of a mobile terminal according to one or more embodiments of the present disclosure can greatly shorten the time for the network-disconnected mobile terminal to listen to a gateway broadcast by adding the sending of the temporary supplementary broadcast frame after the network disconnection of the target mobile terminal is detected, thus realizing the purpose of enabling the mobile terminal to rejoin a network quickly, and at the same time achieving the effects of reducing the power consumption of the mobile terminal and improving the response time of the mobile terminal.

In an exemplary embodiment, the method according to one or more embodiments of the present disclosure may be executed by a single device, such as a computer. The method of this embodiment is applicable to a distributed scenario, which is implemented by multiple devices cooperating with each other. In such case of the distributed scenario, one of the multiple devices may execute only one or more steps of the method in one or more embodiments of the present disclosure, and the multiple devices interact with each other to implement the method.

Figure 6:
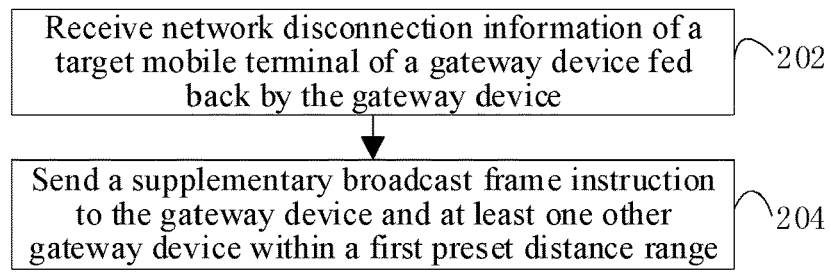
FIG. 6 is a schematic flowchart of a method for rejoining a network after network disconnection of a mobile terminal according to one or more embodiments of the present disclosure.

FIG. 6 illustrates a schematic flowchart of a method for rejoining a network after network disconnection of a mobile terminal according to one or more embodiments of the present disclosure.

Referring to FIG. 6, the method for rejoining a network after network disconnection of a mobile terminal is applied to a server and includes:

Step 202, receiving network disconnection information of a target mobile terminal of a gateway device fed back by the gateway device.

In this step, after receiving the network disconnection information, the server determines that the network connection between the target mobile terminal and the gateway device is disconnected.

Step 204, sending a supplementary broadcast frame instruction to the gateway device and at least one other gateway device within a first preset distance range.

The first preset distance range is a range defined by taking the gateway device as a center and a first distance as a radius. The first distance may be set as needed, which is not specifically limited herein.

In this step, after the server determines that network connection between the the target mobile terminal and the gateway device is disconnected, in order to enable the target mobile terminal to rejoin a network as soon as possible, the server sends the supplementary broadcast frame instruction to the gateway device and the at least one other gateway device within the first preset distance range.

In an exemplary embodiment, a specific method for determining other gateway device within the first preset distance range may be, for example, determining other gateway device whose location is within a range defined by taking the gateway device as a center and the first distance as a radius.

In an exemplary embodiment, if there are multiple other gateway devices within the first preset distance range, in some embodiments, the supplementary broadcast frame instruction may not be sent to all of the other gateway devices within the first preset distance range, instead, the supplementary broadcast frame instruction may be sent to some of the other gateway devices within the first preset distance range. For example, two other gateway devices within the first preset distance range relative to the gateway device and at shortest linear distances from the gateway device may be designated as the other gateway devices for receiving the supplementary broadcast frame instruction.

It can be seen from the above embodiments that the method for rejoining a network after network disconnection of a mobile terminal according to one or more embodiments of the present disclosure realizes the purpose of enabling the positioned mobile terminal to rejoin a network quickly by addition of a temporary broadcast frame for the gateway device and the at least one other gateway device within the first preset distance range. The method for rejoining a network after network disconnection of a mobile terminal according to one or more embodiments of the present disclosure can greatly shorten the time for the network-disconnected mobile terminal to detect a gateway broadcast, thus realizing the purpose of enabling the mobile terminal to rejoin a network quickly, and at the same time achieving the effects of reducing the power consumption of the mobile terminal and improving the response time of the mobile terminal.

In addition, if the target mobile terminal disconnects from a network due to an unstable connection (rather than due to movement to a range outside the coverage of the gateway device), the target mobile terminal can still rejoin a network quickly by sending the supplementary broadcast frame instruction to the gateway device (i.e., the gateway device currently disconnecting from the target mobile terminal). By sending the supplementary broadcast frame instruction to the at least one other gateway device within the first preset distance range, the target mobile terminal disconnecting from a network due to a location change can rejoin a network more quickly, since other gateway devices within the first preset distance range are usually a gateway device relatively close to the gateway device (i.e., the gateway device currently disconnecting from the target mobile terminal) and the target mobile terminal is more likely to move into the coverage of the other gateway devices.

In one or more embodiments of the present disclosure, the method further includes: receiving locating information fed back by the target mobile terminal.

Sending the supplementary broadcast frame instruction to the gateway device and the at least one other gateway device within the first preset distance range relative to the gateway device includes:

determining a second preset distance range according to the locating information, wherein the second preset distance range is a range defined by taking a positioned location in the locating information as a center and a second distance as a radius; and sending the supplementary broadcast frame instruction to the gateway device and other gateway devices within the first preset distance range and the second preset distance range.

In this embodiment, the second preset distance range is determined according to the locating information fed back by the target mobile terminal, and other gateway devices to which the supplementary broadcast frame instruction is to be sent is determined on the basis of the first preset distance range and the second preset distance range, thus other gateway devices that are more likely to be connected to the target mobile terminal can be accurately positioned, and the number of other gateway devices to which the temporary supplementary broadcast frame needs to be sent may be reduced to a certain extent, and thereby reducing the overall power consumption of the system.

In one or more embodiments of the present disclosure, the method further includes the following:

determining locating information fed back by the target mobile terminal last time.

Sending the supplementary broadcast frame instruction to the gateway device and the at least one other gateway device within the first preset distance range relative to the gateway device includes the following acts:

determining the second preset distance range according to the locating information fed back by the target mobile terminal last time, wherein the second preset distance range is a range defined by taking a positioned location in the locating information fed back last time as a center and a second distance as a radius.

The supplementary broadcast frame instruction is sent to the gateway device and other gateway devices within the first preset distance range and the second preset distance range.

In this embodiment, the second preset distance range is defined according to the locating information fed back by the target mobile terminal last time, thus the current possible location of the target mobile terminal is better determined, other gateway devices that are more likely to be connected to the target mobile terminal can be more accurately positioned, and the number of other gateway devices to which the temporary supplementary broadcast frame needs to be sent may be reduced to a certain extent, and thereby reducing the overall power consumption of the system.

In one or more embodiments of the present disclosure, the method further includes:

receiving locating information fed back by the target mobile terminal;

determining a movement track of the target mobile terminal according to the locating information fed back by the target mobile terminal and received within a predetermined time length range from a current time node.

Sending the supplementary broadcast frame instruction to the gateway device and the at least one other gateway device within the first preset distance range relative to the gateway device includes:

determining a predicted movement direction of the target mobile terminal according to the movement track; and sending the supplementary broadcast frame instruction to the gateway device and other gateway devices which are within the first preset distance range and in the predicted movement direction relative to the gateway device.

For example, referring to FIG. 1, assuming that the target mobile terminal uploads the locating information once at each gray dot, the movement track (the track of gray dots in FIG. 1) of the target mobile terminal may be determined according to the locating information. Therefore, it can be predicted that the predicted movement direction of the target mobile terminal is from the gateway m to the gateway k. In this case, the gateway k may be used as an object for receiving the supplementary broadcast frame instruction, while the gateway n may not be used as an object for receiving the supplementary broadcast frame instruction.

In this embodiment, the movement track of the target mobile terminal is determined according to the locating information uploaded by the target mobile terminal within the predetermined time length range from the current time node, and the possible movement direction of the target mobile terminal is predicted according to the movement track, thus the current possible location of the target mobile terminal can be better determined so as to more accurately position other gateway device that is more likely to be connected to the target mobile terminal, and the number of other gateway devices that need to send temporary supplementary broadcast frames can be reduced to a certain extent, and thereby reducing the overall power consumption of the system.

In an exemplary embodiment, the method according to one or more embodiments of the present disclosure may be executed by a single device, such as a computer or a server. The method of this embodiment is applicable to a distributed scenario, which is implemented by multiple devices cooperating with each other. In such case of the distributed scenario, one of the multiple devices may execute only one or more steps of the method according to one or more embodiments of the present disclosure, and the multiple devices interact with each other to implement the method.

Figure 7:
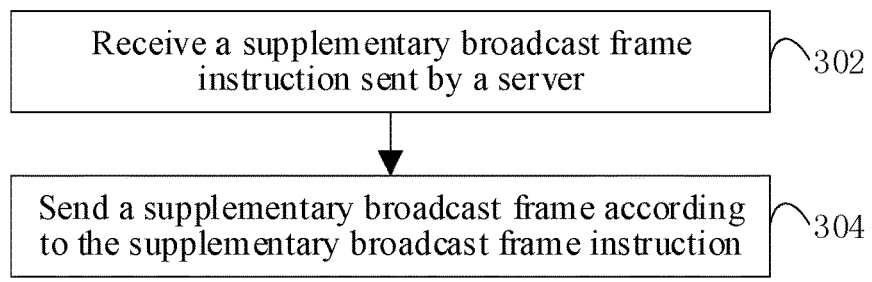
FIG. 7 is a schematic flowchart of a method for rejoining a network after network disconnection of a mobile terminal according to one or more embodiments of the present disclosure.

FIG. 7 illustrates a schematic flowchart of a method for rejoining a network after network disconnection of a mobile terminal according to one or more embodiments of the present disclosure.

Referring to FIG. 7, the method for rejoining a network after network disconnection of a mobile terminal is applied to a gateway device and includes:

Step 302, receiving a supplementary broadcast frame instruction sent by a server; and Step 304, sending a supplementary broadcast frame according to the supplementary broadcast frame instruction.

In this step, the supplementary broadcast frame is a temporary broadcast frame independent of a broadcast frame in a normal working cycle of the gateway device, and is used to enable the mobile terminal in a network-disconnected state within the range of the gateway device to rejoin a network as soon as possible.

In an exemplary embodiment, the supplementary broadcast frame may be sent in an idle time slot so that a normal working process is not affected.

The method for rejoining a network after network disconnection of a mobile terminal according to one or more embodiments of the present disclosure realizes the purpose of enabling the positioned mobile terminal to rejoin a network quickly by addition of the temporary broadcast frame. The method for rejoining a network after network disconnection of a mobile terminal can greatly shorten the time for the mobile terminal disconnected from the network to detect a gateway broadcast, thus realizing the purpose of enabling the mobile terminal to rejoin a network quickly, and at the same time achieving the effects of reducing the power consumption of the mobile terminal and improving the response time of the mobile terminal.

In an exemplary embodiment, the method according to one or more embodiments of the present disclosure may be executed by a single device, such as a computer. The method of this embodiment is applicable to a distributed scenario, which is implemented by multiple devices cooperating with each other. In such case of the distributed scenario, one of the multiple devices may execute only one or more steps of the method according to one or more embodiments of the present disclosure, and the multiple devices interact with each other to implement the method.

Figure 8:
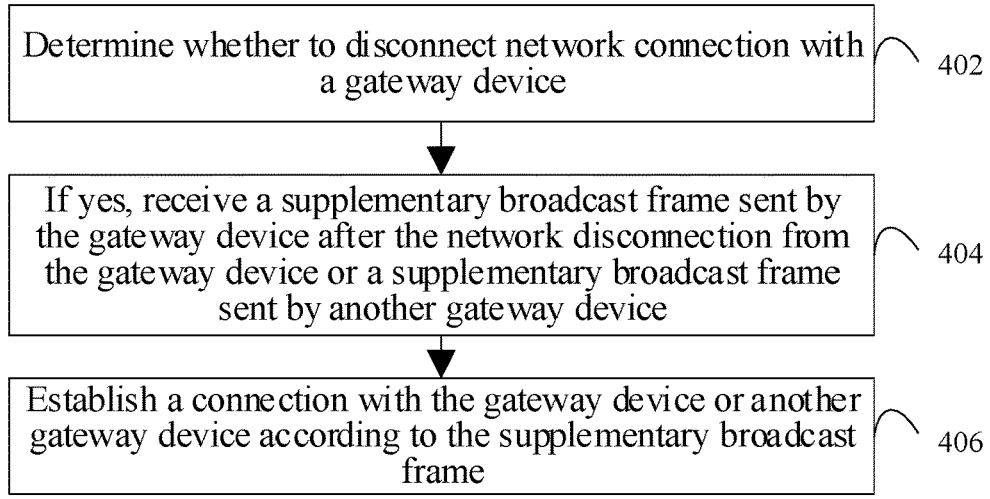
FIG. 8 is a schematic flowchart of a method for rejoining a network after network disconnection of a mobile terminal according to one or more embodiments of the present disclosure.

FIG. 8 illustrates a schematic flowchart of a method for rejoining a network after network disconnection of a mobile terminal according to one or more embodiments of the present disclosure.

Referring to FIG. 8, the method for rejoining a network after network disconnection of a mobile terminal is applied to a mobile terminal and includes:

Step 402, determining whether to disconnect network connection with a gateway device.

In an exemplary embodiment, the method further includes sending a heartbeat frame to the gateway device.

The step of determining whether to disconnect the network connection with the gateway device specifically includes determining whether a response message from the gateway device for the heartbeat frame is received. If the response message from the gateway device for the heartbeat frame is not received, it indicates that the network connection between the mobile terminal and the gateway device is disconnected.

Step 404, if the response message from the gateway device for the heartbeat frame is received, receiving a supplementary broadcast frame sent by the gateway device after the disconnection from the gateway device or a supplementary broadcast frame sent by other gateway device.

Step 406, establishing a connection with the gateway device or other gateway device according to the supplementary broadcast frame.

In this step, the supplementary broadcast frame is a temporary broadcast frame independent of a broadcast frame in a normal working cycle of the gateway device, and is used to enable the mobile terminal in a network-disconnected state within the coverage of the gateway device to rejoin a network as soon as possible.

In the method for rejoining a network after network disconnection of a mobile terminal according to one or more embodiments of the present disclosure, the mobile terminal can realize the purpose of rejoining a network quickly according to the temporary broadcast frame. The method for rejoining a network after network disconnection of a mobile terminal can greatly shorten the time for the network-disconnected mobile terminal to detect a gateway broadcast, thus realizing the purpose of enabling the mobile terminal to rejoin a network quickly, and at the same time achieving the effects of reducing the power consumption of the mobile terminal and improving the response time of the mobile terminal.

In one or more embodiments of the present disclosure, the mobile terminal may be a terminal with low power consumption, such as an electronic badge, a smart card, or a bedside card. Compared with a mobile terminal such as a mobile phone, the power consumption of the mobile terminal in one or more embodiments of the present disclosure is lower. Generally, a display screen of a mobile terminal with low power consumption uses an electronic paper display. Compared with a display screen of a mobile terminal such as a mobile phone, the power consumption of the electronic paper display is very low. In the case of low power consumption of the display screen, the power consumption of a communication unit of the mobile terminal in one or more embodiments of the present disclosure is second only to the power consumption of the display screen. Therefore, reducing the power consumption of the communication unit is very important for the mobile terminal with low power consumption.

Reception and sending of data in a network are usually implemented by using a socket in an operating system. However, if the socket is disconnected, a problem necessarily occurs in sending and reception of the data. How to determine whether the socket is still available requires creation of a heartbeat mechanism in the system. The so-called "heartbeat" refers to timed sending of a customized structural body (a heartbeat packet or a heartbeat frame) to let the other party know that one party is "online", to ensure the effectiveness of a link.

In an exemplary embodiment, the method further includes feeding back a heartbeat frame to the gateway device at a predetermined time interval, so that the gateway device determines whether the mobile terminal is disconnected from the gateway device according to the heartbeat frame. If the heartbeat frame sent by the mobile terminal is not received within a heartbeat frame cycle, it indicates that the mobile terminal is disconnected from the gateway device.

In an exemplary embodiment, a time difference between disconnecting from the gateway device (for example, a time point between t1 and t2 in FIG. 2) and receiving the supplementary broadcast frame (for example, t3 in FIG. 2) is less than twice the cycle that the mobile terminal sends the heartbeat frame (for example, t2–t1 or t4–t2 in FIG. 2).

As an exemplary embodiment, the method further includes:

feeding back locating information of the mobile terminal to a server.

In an exemplary embodiment, the mobile terminal may report the locating information to the server according to a predetermined frequency, so that the server can determine the location of the mobile terminal according to the locating information.

In an exemplary embodiment, the locating information of the mobile terminal may be implemented by a Bluetooth technology, such as the Bluetooth Low Energy (BLE) technology. In this scenario, the system requires the deployment of a Bluetooth beacon. A Bluetooth module of the mobile terminal interacts with the Bluetooth beacon to implement the positioning, and can generate the locating information according to positioning data and report the locating information to the server. Certainly, the locating mode here is only exemplary, and there may be other positioning modes if the mobile terminal adopts another positioning technology (for example, RFID).

In an exemplary embodiment, the locating information may be forwarded to the server via the gateway device.

In an exemplary embodiment, the method according to one or more embodiments of the present disclosure may be executed by a single device, such as a computer. The method of this embodiment is applicable to a distributed scenario, which is implemented by multiple devices cooperating with each other. In such case of the distributed scenario, one of the multiple devices may execute only one or more steps of the method according to one or more embodiments of the present disclosure, and the multiple devices interact with each other to implement the method.

Figure 9:
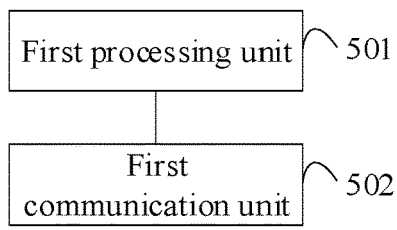
FIG. 9 is a schematic block diagram of structure of a gateway device according to one or more embodiments of the present disclosure.

FIG. 9 illustrates a schematic block diagram of a structure of a gateway device provided by one or more embodiments of the present disclosure.

Referring to FIG. 9, the gateway device includes:

a first processing unit 501 configured to determine whether to disconnect network connection with a target mobile terminal, and generate a supplementary broadcast frame according to a supplementary broadcast frame instruction; and a first communication unit 502 configured to:

feed back network disconnection information of the target mobile terminal to a server when the target mobile terminal is disconnected;

receive the supplementary broadcast frame instruction sent by the server; and send the supplementary broadcast frame according to the supplementary broadcast frame instruction.

It can be seen from the above embodiments that the gateway device according to one or more embodiments of the present disclosure can greatly shorten the time for the mobile terminal disconnected from the network to detect a gateway broadcast by addition of the sending of the temporary supplementary broadcast frame after the network disconnection of the target mobile terminal is detected, thus realizing the purpose of enabling the mobile terminal to rejoin a network quickly, and at the same time achieving the effects of reducing the power consumption of the mobile terminal and improving the response time of the mobile terminal.

In an exemplary embodiment, the first communication unit 502 is configured to send the supplementary broadcast frame in an idle time slot.

In an exemplary embodiment, the first processing unit 501 is configured to determine whether a heartbeat frame of the target mobile terminal is received within a predetermined time interval.

In an exemplary embodiment, a time difference between feeding back the network disconnection information and sending the supplementary broadcast frame is less than a cycle that the target mobile terminal sends the heartbeat frame.

In the present disclosure, for the convenience of description, in the description of the above device, functions are respectively described in the form of various modules. Of course, in implementation of one or more embodiments of the present disclosure, the functions of the modules may be implemented in the same or different pieces of software and/or hardware. Although the above discussion mainly concerns a microprocessor or multi-core processor that executes software, some implementations are performed by one or more integrated circuits (for example, Application Specific Integrated Circuits (ASICs) or Field Programmable Gate Arrays (FPGAs)). In some embodiments, such an integrated circuit executes an instruction stored on the circuit itself.

The apparatus in the above embodiment is used to implement a corresponding method in the above embodiment, and has the beneficial effects of the corresponding method embodiment, which are not described here again.

Figure 10:
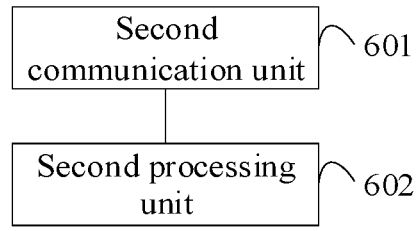
FIG. 10 is a schematic block diagram of a structure of a server according to one or more embodiments of the present disclosure.

FIG. 10 illustrates a schematic block diagram of a structure of a server according to one or more embodiments of the present disclosure.

Referring to FIG. 10, the server includes:

a second communication unit 601 configured to receive network disconnection information of a target mobile terminal fed back by a gateway device, and send a supplementary broadcast frame instruction to the gateway device and at least one other gateway device within a first preset distance range; and a second processing unit 602 configured to generate the supplementary broadcast frame instruction according to the network disconnection information.

The first preset distance range is a range defined by taking the gateway device as a center and a first distance as a radius.

It can be seen from the above embodiments that the server according to one or more embodiments of the present disclosure realizes the purpose of enabling the positioned mobile terminal to rejoin a network quickly by addition of a temporary broadcast frame for the gateway device and the at least one other gateway device within the first preset distance range. The method for rejoining a network after network disconnection of a mobile terminal according to one or more embodiments of the present disclosure can greatly shorten the time for the mobile terminal disconnected from the network to detect a gateway broadcast, thus realizing the purpose of enabling the mobile terminal to rejoin a network quickly, and at the same time achieving the effects of reducing the power consumption of the mobile terminal and improving the response time of the mobile terminal.

In an exemplary embodiment, the second communication unit 601 is configured to receive locating information fed back by the target mobile terminal, and send the supplementary broadcast frame instruction to the gateway device and other gateway devices in the first preset distance range and a second preset distance range.

The second processing unit 602 is configured to determine the second preset distance range according to the locating information. The second preset distance range is a range defined by taking a positioned location in the locating information as a center and a second distance as a radius.

In an exemplary embodiment, the second processing unit 602 is configured to: determine locating information fed back by the target mobile terminal last time, and determine the second preset distance range according to the locating information fed back by the target mobile terminal last time. The second preset distance range is a range defined by taking a positioned location in the locating information fed back last time as a center and a second distance as a radius.

The second communication unit 601 is configured to send the supplementary broadcast frame instruction to the gateway device and other gateway devices within the first preset distance range and the second preset distance range.

In an exemplary embodiment, the second communication unit 601 is configured to receive the locating information fed back by the target mobile terminal, and send the supplementary broadcast frame instruction to the gateway device and other gateway devices within the first preset distance range and in a predicted movement direction relative to the gateway device.

The second communication unit 601 is configured to determine a movement track of the target mobile terminal according to the locating information fed back by the target mobile terminal and received within a predetermined time length range from a current time node, and determine the predicted movement direction of the target mobile terminal according to the movement track.

In the present disclosure, for the convenience of description, in the description of the above device, functions are respectively described in the form of various modules. Of course, in implementation of one or more embodiments of the present disclosure, the functions of the modules may be implemented in the same or different pieces of software and/or hardware. Although the above discussion mainly concerns a microprocessor or multi-core processor that executes software, some implementations are performed by one or more integrated circuits (for example, Application Specific Integrated Circuits (ASICs) or Field Programmable Gate Arrays (FPGAs)). In some embodiments, such an integrated circuit executes an instruction stored on the circuit itself.

The apparatus in the above embodiment is used to implement a corresponding method in the above embodiment, and has the beneficial effects of the corresponding method embodiment, which are not described here again.

Figure 11:
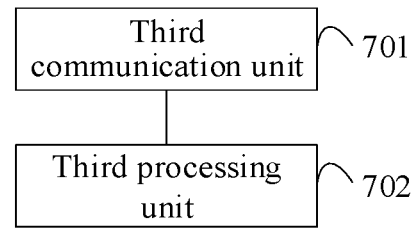
FIG. 11 is a schematic block diagram of a structure of a gateway device according to one or more embodiments of the present disclosure.

FIG. 11 illustrates a schematic block diagram of a structure of a gateway device provided by one or more embodiments of the present disclosure.

Referring to FIG. 11, the gateway device includes:

a third communication unit 701 configured to receive a supplementary broadcast frame instruction sent by a server, and send a supplementary broadcast frame according to the supplementary broadcast frame instruction; and a third processing unit 702 configured to generate the supplementary broadcast frame according to the supplementary broadcast frame instruction.

The gateway device according to one or more embodiments of the present disclosure realizes the purpose of enabling the positioned mobile terminal to rejoin a network quickly by addition of the temporary broadcast frame. The method for rejoining a network after network disconnection of a mobile terminal can greatly shorten the time for the mobile terminal disconnected from the network to detect a gateway broadcast, thus realizing the purpose of enabling the mobile terminal to rejoin a network quickly, and at the same time achieving the effects of reducing the power consumption of the mobile terminal and improving the response time of the mobile terminal.

In an exemplary embodiment, the third communication unit 701 is configured to send the supplementary broadcast frame in an idle time slot.

In the present disclosure, for the convenience of description, in the description of the above device, functions are respectively described in the form of various modules. Of course, in implementation of one or more embodiments of the present disclosure, the functions of the modules may be implemented in the same or different pieces of software and/or hardware. Although the above discussion mainly concerns a microprocessor or multi-core processor that executes software, some implementations are performed by one or more integrated circuits (for example, Application Specific Integrated Circuits (ASICs) or Field Programmable Gate Arrays (FPGAs)). In some embodiments, such an integrated circuit executes an instruction stored on the circuit itself.

The apparatus in the above embodiment is used to implement a corresponding method in the above embodiment, and has the beneficial effects of the corresponding method embodiment, which are not described here again.

One or more embodiments of the present disclosure provide a mobile terminal. The mobile terminal includes:

a fourth communication unit configured to:
disconnect network connection with a gateway device;
receive a supplementary broadcast frame sent by the gateway device or a supplementary broadcast frame sent by another gateway device;
establish a connection with the gateway device or the another gateway device according to the supplementary broadcast frame.

The mobile terminal according to one or more embodiments of the present disclosure realizes the purpose of rejoining a network quickly after network disconnection according to a temporary broadcast frame. The method for rejoining a network after network disconnection of a mobile terminal can greatly shorten the time for the mobile terminal disconnected with the network to detect a gateway broadcast, thus realizing the purpose of enabling the mobile terminal to rejoin a network quickly, and at the same time achieving the effects of reducing the power consumption of the mobile terminal and improving the response time of the mobile terminal.

In an exemplary embodiment, a time difference between disconnecting from the gateway device and receiving the supplementary broadcast frame is less than twice a cycle that the mobile terminal sends a heartbeat frame.

In an exemplary embodiment, the fourth communication unit is configured to feed back locating information of the mobile terminal to a server.

Certainly, the mobile terminal may further include a fourth processing unit for data processing.

In an exemplary embodiment, the mobile terminal includes an Electronic Paper Display (EPD), and the electronic paper display is powered by a battery.

In the present disclosure, for the convenience of description, in the description of the above device, functions are respectively described in the form of various modules. Of course, in implementation of one or more embodiments of the present disclosure, the functions of the modules may be implemented in the same or different pieces of software and/or hardware. Although the above discussion mainly concerns a microprocessor or multi-core processor that executes software, some implementations are performed by one or more integrated circuits (for example, Application Specific Integrated Circuits (ASICs) or Field Programmable Gate Arrays (FPGAs)). In some embodiments, such an integrated circuit executes an instruction stored on the circuit itself.

The apparatus in the above embodiment is used to implement a corresponding method in the above embodiment, and has the beneficial effects of the corresponding method embodiment, which are not described here again.

One or more embodiments of the present disclosure further provide a system for rejoining a network after network disconnection of a mobile terminal. Referring to FIG. 5, the system for rejoining a network after network disconnection of a mobile terminal includes:

the gateway device according to any one of the above embodiments (refer to FIG. 9);

the server according to any one of the above embodiments (refer to FIG. 10);

at least one other gateway device according to any one of the above embodiments (refer to FIG. 11); and at least one mobile terminal according to any one of the above embodiments.

In one or more embodiments of the present disclosure, referring to FIG. 5, an Internet of Things system of the mobile terminal includes a mobile terminal (SmartCard), a gateway (GateWay), an IOT platform, a middleground, and a web server. The mobile terminal is mainly responsible for receiving information, displaying the information by an EPD, obtaining alarm and locating information, uploading the alarm and locating information to the server via the gateway, and implementing operations of a user such as screen swiping. The gateway is mainly responsible for information transmission between the mobile terminal and the server. Each gateway may correspond to multiple mobile terminals, but each mobile terminal can only join a network from one gateway. The mobile terminal and the gateway communicate with each other in a mode of Long Range Radio (LoRa) or FSK (Sx1278 chip may be used). Information of the mobile terminal and information of the server are both forwarded via the IOT platform and the middleground.

FIG. 2 illustrates a schematic diagram of broadcast frames sent by a gateway before and after network disconnection when a mobile terminal rejoins a network in one or more embodiments of the present disclosure. The broadcast frame sent at the moment t3 is a temporary supplementary broadcast frame.

Figure 4:
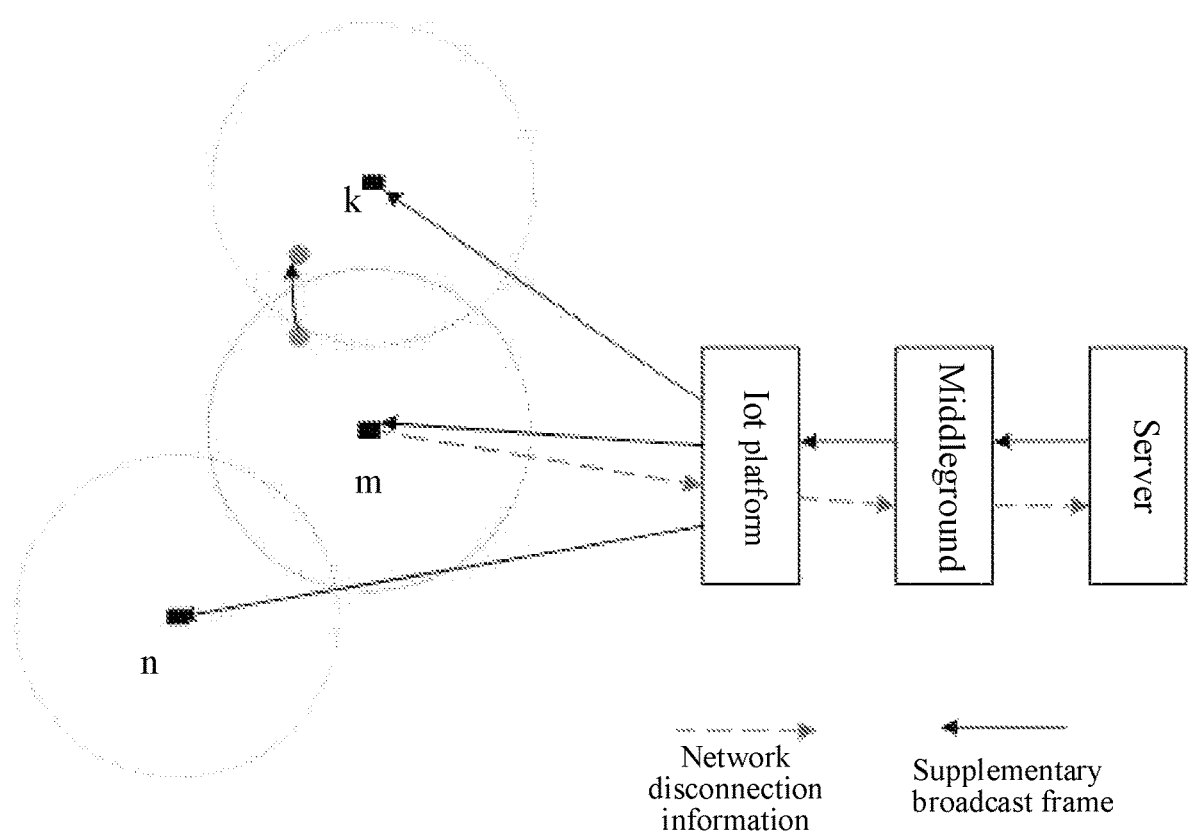
FIG. 4 is a schematic diagram of interaction between a gateway device and a server in one or more embodiments of the present disclosure.

When the mobile terminal is disconnected from a network, that is, the gateway device does not receive a heartbeat frame of a certain mobile terminal Card mn within the coverage thereof at a predetermined time (moment t2), the gateway device feeds back network disconnection information of the mobile terminal to the web server via the Internet of Things platform (IoT platform) and the middleground. The web server searches for other gateway device near the gateway device (such as a gateway k and a gateway n), and sends, to the gateway device and the nearby gateway device, an instruction for adding a temporary supplementary broadcast frame (refer to FIG. 4). After receiving the instruction, the gateway devices k, m, and n each send a temporary broadcast frame in an idle time slot (moment t3), wherein a time difference between t3 and t2 is denoted as Tw. In this way, the mobile terminal Card mn which is disconnected from the network can rejoin a network after waiting for Tw instead of an original waiting time t4–t2, thus greatly shortening the listening time of the mobile terminal, reducing the power consumption of the mobile terminal, as well as reducing a time for the mobile terminal to rejoin a network and improving the response time of the mobile terminal.

The system for rejoining a network after network disconnection of a mobile terminal according to one or more embodiments of the present disclosure can enable the mobile terminal to rejoin a network quickly once the mobile terminal disconnects from a network, by adding the temporary broadcast frame of the nearby gateways. When the gateway does not receive information of an intelligent mobile terminal within the coverage thereof at a predetermined moment, the gateway feeds back a network-disconnected state and a network-disconnection time of the intelligent mobile terminal to the server. Then the server sends an instruction to the nearby gateways of the gateway according to the location of the gateway, instructing the nearby gateways to send a temporary broadcast frame in a latest idle time slot, so that the mobile terminal can detect the broadcast frame in a relatively short time and register to the gateway to join a network, thus enabling the mobile terminal to rejoin a network quickly. The system for rejoining a network after network disconnection of a mobile terminal according to one or more embodiments of the present disclosure can realize the purpose of rejoining a network quickly by adding the temporary broadcast frame of the nearby gateways according to the location of the gateway to which the mobile terminal belongs before network disconnection. The system for rejoining a network after network disconnection of a mobile terminal according to one or more embodiments of the present disclosure can greatly shorten the time for the mobile terminal disconnected from the network to detect a gateway broadcast, thus realizing the purpose of enabling the mobile terminal to rejoin a network quickly, and achieving the effects of reducing the power consumption of the mobile terminal and improving the response time of the mobile terminal.

The above effects are particularly obvious when the number of mobile terminals covered by the gateway is relatively small. For example, in the case when there is no other mobile terminal connected to network after the mobile terminal Card mn, the value of Tw is a time interval between reporting to the server by the gateway and receiving the instruction from the server, which is generally at a level of ms or even µs and is almost negligible, that is, the mobile terminal can rejoin the network quickly.

Figure 12:
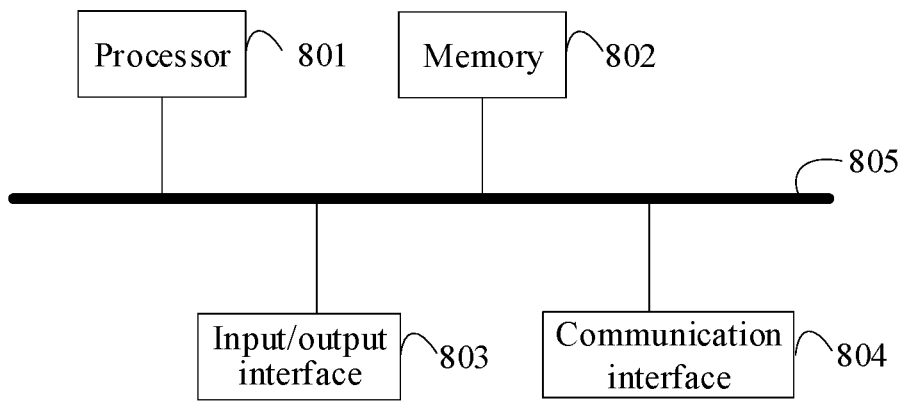
FIG. 12 is a schematic diagram of a hardware structure of an electronic device according to one or more embodiments of the present disclosure.

FIG. 12 illustrates a schematic diagram of a hardware structure of an electronic device according to one or more embodiments of the present disclosure. The device may include a processor 801, a memory 802, an input/output interface 803, a communication interface 804, and a bus 805. The processor 801, the memory 802, the input/output interface 803, and the communication interface 804 realize communication connection therebetween in the device via the bus 805.

The processor 801 may be implemented by means of a general Central Processing Unit (CPU), a microprocessor, an Application Specific Integrated Circuit (ASIC), or one or more integrated circuits, and is configured to execute related programs to implement the technical solutions provided by the embodiments of the present disclosure.

The memory 802 may be implemented in the form of a Read Only Memory (ROM), a Random Access Memory (RAM), a static storage device, a dynamic storage device, etc. The memory 802 may store an operating system and other application programs. When the technical solutions provided by the embodiments of the present disclosure are implemented by software or firmware, related program codes are stored in the memory 802 and called and executed by the processor 801.

The input/output interface 803 is configured to be connected to an input/output module to realize information input and output. The input/output module may be configured in the device as a component (not shown) or externally connected to the device to provide a corresponding function. The input device may include a keyboard, a mouse, a touch screen, a microphone, various sensors, or the like. The output device may include a display, a speaker, a vibrator, an indicator lamp, or the like.

The communication interface 804 is configured to be connected to a communication module (not shown) to implement communication interaction between the current device and other device. The communication module can implement communication in a wired mode (such as a USB or network cable) or a wireless mode (such as a mobile network, WiFi, or Bluetooth).

The bus 805 includes a path for transmitting information between various components (for example, the processor 801, the memory 802, the input/output interface 803, and the communication interface 804) of the device.

In an exemplary embodiment, although the above device only includes the processor 801, the memory 802, the input/output interface 803, the communication interface 804, and the bus 805, in the specific implementation process, the device may also include other components necessary for normal operation. In addition, it can be understood by those skilled in the art that the above device may include only the components necessary for realizing the solutions in the embodiments of the present disclosure, rather than all of the components shown in the drawings.

To sum up, the method for rejoining a network after network disconnection of a mobile terminal and related devices according to one or more embodiments of the present disclosure can greatly shorten a time for the mobile terminal disconnected from the network to detect a gateway broadcast by addition of the sending of the temporary supplementary broadcast frame after the network disconnection of the target mobile terminal is detected, thus realizing the purpose of enabling the mobile terminal to rejoin a network quickly, and at the same time achieving the effects of reducing the power consumption of the mobile terminal and improving the response time of the mobile terminal.

The computer-readable medium of the present embodiment includes permanent and non-permanent, removable and non-removable media, which can implement information storage by any method or technology. The information may be a computer-readable instruction, a data structure, a module of a program, or other data. Examples of storage media of a computer include, but are not limited to, a Phase change Random Access Memory (PRAM), a Static Random Access Memory (SRAM), a Dynamic Random Access Memory (DRAM), other type of Random Access Memory (RAM), a Read Only Memory (ROM), an Electrically Erasable Programmable Read Only Memory (EEPROM), a flash memory or other memory technology, a Compstep Disc Read Only Memory (CD-ROM), a Digital Versatile Disc (DVD) or other optical memory, a cartridge magnetic tape, a magnetic tape and magnetic disk memory or other magnetic storage device or any other non-transmission medium, which can be used to store information that can be accessed by a computing device.

Specific embodiments of the present disclosure are described above. Other embodiments fall within the scope of the appended claims. In some cases, the actions or steps recorded in the claims may be performed in an order different from those in the embodiments and may still achieve the desired results. In addition, the processes illustrated in the drawings do not necessarily require the specific order or continuous order illustrated to achieve the desired results. In some embodiments, multitask processing and parallel processing are feasible or possibly advantageous.

Those skilled in the art should understand that the discussion in any of the above embodiments is only exemplary and is not intended to imply that the scope of the present disclosure (including the claims) is limited to these examples; under the concept of the present disclosure, the above embodiments or the technical features in different embodiments may be combined, and the steps may be implemented in any order. There are many other changes in different aspects of one or more embodiments of the present disclosure as described above, which are not provided in details for simplicity.

In addition, in order to simplify the description and discussion and in order not to make one or more embodiments of the present disclosure difficult to be understood, well-known power/ground connections with an integrated circuit (IC) chip and other components may or may not be illustrated in the provided drawings. In addition, the device may be illustrated in the form of a block diagram so as to avoid making one or more embodiments of the present disclosure difficult to be understood, and the following fact is taken into account: the details of the embodiments of these block diagram devices are highly dependent on the platform on which one or more embodiments of the present disclosure are to be implemented (that is, these details shall fall within the range that can be fully understood by those skilled in the art). In the case where specific details (for example, circuits) are set forth to describe exemplary embodiments of the present disclosure, it would be apparent to those skilled in the art that one or more embodiments of the present disclosure may be implemented without these specific details or with changes in these specific details. Therefore, these descriptions should be considered descriptive rather than restrictive.

Although the present disclosure is described in combination with specific embodiments of the present disclosure, many replacements, modifications, and variations of these embodiments are apparent to those skilled in the art according to the previous description. For example, other memory architectures (e.g., dynamic RAM (DRAM)) may use the discussed embodiments.

One or more embodiments of the present disclosure are intended to cover all such replacements, modifications, and variations that fall within the broad scope of the appended claims. Therefore, any omission, modification, equivalent replacement, improvement and the like made within the spirit and principle of one or more embodiments of the present disclosure shall be included in the scope of protection of the present disclosure.

What is claimed is:

1. A method for rejoining a network after network disconnection of a mobile terminal, applied to a gateway device, comprising steps of:
   determining whether to disconnect network connection with a target mobile terminal; and
   sending a supplementary broadcast frame when the gateway device is disconnected from the target mobile terminal;
   wherein the method further comprises:
   feeding back network disconnection information of the target mobile terminal to a server when the connection between the gateway device and the target mobile terminal is disconnected;
   receiving a supplementary broadcast frame instruction fed back by the server; and
   sending the supplementary broadcast frame according to the supplementary broadcast frame instruction;
   wherein a time difference between feeding back the network disconnection information and sending the supplementary broadcast frame is less than a cycle that the target mobile terminal sends a heartbeat frame.

2. The method for rejoining the network according to claim 1, wherein the step of determining to disconnect network connection with the target mobile terminal comprises:
   determining whether the heartbeat frame of the target mobile terminal is received within a predetermined time interval.

3. The method for rejoining the network according to claim 1, wherein the step of sending the supplementary broadcast frame comprises:
   sending the supplementary broadcast frame in an idle time slot of the gateway device.

4. The method according to claim 1, wherein the step of sending the supplementary broadcast frame comprises:
   sending the supplementary broadcast frame in an idle time slot.

5. A method for rejoining a network after network disconnection of a mobile terminal, applied to a server, comprising:
   receiving, by the server, network disconnection information of a target mobile terminal of a gateway device fed back by the gateway device; and
   sending a supplementary broadcast frame instruction to the gateway device and at least one other gateway device within a first preset distance range relative to the gateway device,
   wherein the first preset distance range is a range defined by taking the gateway device as a center and a first distance as a radius;
   wherein the method further comprises:
   receiving locating information fed back by the target mobile terminal; and
   determining a movement track of the target mobile terminal according to the locating information fed back by the target mobile terminal and received within a predetermined time length range from a current time node;
   sending the supplementary broadcast frame instruction to the gateway device and the at least one other gateway device within the first preset distance range relative to the gateway device comprises:
   determining a predicted movement direction of the target mobile terminal according to the movement track; and
   sending the supplementary broadcast frame instruction to the gateway device and the at least one other gateway device within the first preset distance range and in the predicted movement direction relative to the gateway device.

6. The method for rejoining the network according to claim 5, further comprising:
   sending the supplementary broadcast frame instruction to the gateway device and the at least one other gateway device within the first preset distance range relative to the gateway device comprises:
   determining a second preset distance range according to the locating information, wherein the second preset distance range is a range defined by taking a positioned location in the locating information as a center and a second distance as a radius; and
   sending the supplementary broadcast frame instruction to the gateway device and the at least one other gateway device within the first preset distance range and the second preset distance range.

7. The method for rejoining the network according to claim 6, further comprising:
   determining locating information fed back by the target mobile terminal last time;
   sending the supplementary broadcast frame instruction to the gateway device and the at least one other gateway device within the first preset distance range relative to the gateway device comprises:
   determining the second preset distance range according to the locating information fed back by the target mobile terminal last time, wherein the second preset distance range is a range defined by taking a positioned location in the locating information fed back last time as a center and the second distance as a radius; and
   sending the supplementary broadcast frame instruction to the gateway device and the at least one other gateway device within the first preset distance range and the second preset distance range.

8. A method for rejoining a network after network disconnection of a mobile terminal, applied to the mobile terminal, comprising:
   determining whether to disconnect network connection with a gateway device;
   when it is determined to disconnect the network connection with the gateway device, receiving a supplementary broadcast frame sent by the gateway device after the disconnection from the gateway device or a supplementary broadcast frame sent by other gateway device; and establishing a connection with the gateway device or other gateway device according to the supplementary broadcast frame;

wherein the method further comprises:

sending a heartbeat frame to the gateway device; and determining whether to disconnect network connection with the gateway device comprises: determining whether a response message from the gateway device for the heartbeat frame is received;

wherein a time difference between disconnecting from the gateway device and receiving the supplementary broadcast frame is less than twice a cycle that the mobile terminal sends the heartbeat frame.

9. The method for rejoining the network according to claim 8, further comprising:

feeding back locating information of the mobile terminal to a server.

10. A gateway device, comprising: a processor and a memory, wherein the memory is configured to store a computer program, and the processor is configured to call and run the computer program stored in the memory to execute the method according to claim 1.

11. A server, comprising: a processor and a memory, wherein the memory is configured to store a computer program, and the processor is configured to call and run the computer program stored in the memory to execute the method according to claim 5.

12. A mobile terminal, comprising: a processor and a memory, wherein the memory is configured to store a computer program, and the processor is configured to call and run the computer program stored in the memory to execute the method according to claim 8.

13. An electronic device, comprising a memory, a processor, and a computer program stored on the memory and runnable on the processor, wherein the processor implements the method according to claim 1 when executing the computer program.

* * * * *